United States Patent
Smith et al.

(10) Patent No.: US 11,069,008 B2
(45) Date of Patent: Jul. 20, 2021

(54) COORDINATION OF GAS PUMP WITH TANK LEVEL SENSORS FOR FRAUD DETECTION

(71) Applicant: iTANK, LLC, Blair, NE (US)

(72) Inventors: Jeffrey O. Smith, Dallas, TX (US); Rodney C. Montrose, Allen, TX (US)

(73) Assignee: Independent Technologies, LLC, Blair, NE (US)

( * ) Notice: Subject to any disclaimer, the term of this patent is extended or adjusted under 35 U.S.C. 154(b) by 332 days.

(21) Appl. No.: 14/872,780

(22) Filed: Oct. 1, 2015

(65) Prior Publication Data

US 2017/0098285 A1  Apr. 6, 2017

(51) Int. Cl.
| | |
|---|---|
| G06Q 50/06 | (2012.01) |
| G06Q 20/20 | (2012.01) |
| G06Q 20/18 | (2012.01) |
| G06Q 20/40 | (2012.01) |
| G06Q 20/32 | (2012.01) |

(52) U.S. Cl.
CPC ............. *G06Q 50/06* (2013.01); *G06Q 20/18* (2013.01); *G06Q 20/202* (2013.01); *G06Q 20/208* (2013.01); *G06Q 20/327* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 5,363,093 A | * | 11/1994 | Williams | B67D 7/08 340/605 |
| 6,374,870 B1 | * | 4/2002 | Muller | B67D 7/067 141/94 |
| 2006/0157145 A1 | * | 7/2006 | Hillam | B67D 7/3209 141/198 |
| 2010/0023162 A1 | * | 1/2010 | Gresak | G07F 13/025 700/241 |
| 2014/0316723 A1 | * | 10/2014 | Rogers | G01M 3/2892 702/55 |
| 2016/0371704 A1 | * | 12/2016 | Akgun | G06F 16/2477 |

* cited by examiner

*Primary Examiner* — Paul Danneman
(74) *Attorney, Agent, or Firm* — Skinner and Associates; Joel D. Skinner, Jr.

(57) ABSTRACT

A system and method are described that can help gas stations detect attempted thefts of gas or when there is leakage from a fuel tank or pump. The fuel pump can comprise a payment processing system or is fuel sensor to detect the amount of fuel pumped. The large fuel tank that supplies the fuel pumps can comprise a fuel level sensor to detect how much fuel is being used. The fuel pumps and tanks can send their data to the kiosk or some other location for analysis. If more fuel is being lost from the fuel tank than is being paid for at the pumps, then a theft may be occurring, or there may be fault machinery or leaks.

19 Claims, 6 Drawing Sheets

COORDINATION OF GAS PUMP WITH TANK LEVEL SENSORS FOR FRAUD DETECTION

TECHNICAL FIELD

The present disclosure is directed to gas pumps and more particularly to theft detection on gas pumps.

BACKGROUND OF THE INVENTION

One problem at as stations is fraud detection. Even at gas stations that require pre-payment, thieves have figured out ways to steal gas. For instance, there are ways to manipulate magnets placed on the exterior of a pump in order to trick the pump into allowing a user to indiscriminately pump as much gas as possible.

Gas stations often have a gas meter on each pump, measuring how much was is being paid for and how much is actually being pumped—from that individual pump. There is also a station-wide meter, often this meter is displayed to an employee at the register inside the gas station. So the employee can see the station wide levels going down or up, but not the levels at each pump.

BRIEF SUMMARY OF THE INVENTION

One embodiment of the present disclosure comprises a system for monitoring fuel pumps and fuel tanks comprising: a plurality of fuel pumps, the plurality of fuel pumps comprising a payment processing system and a fuel sensor operable to measure the amount of fuel pumped and further comprising a first communication interface operable to communicate the payments received or the amount of fuel pumped; a plurality of fuel tanks operable to supply fuel to the plurality of fuel pumps, the plurality of fuel tanks comprising a fuel level sensor operable to detect the level of fuel within the tank, and further comprising a second communication interface operable to communicate the level of fuel; a meter, the meter comprising a third communication interface, the meter operable to analyze payment or fuel data from the plurality of fuel pumps with fuel level data from the plurality of fuel tanks.

Another embodiment comprises a system fin monitoring fuel at gas stations comprising: a plurality of servers; a plurality of gas stations, each gas station comprising a plurality of fuel pumps and a plurality of fuel tanks; the plurality of fuel pumps comprising a first communication interface and as fuel sensor operable to measure the amount of fuel pumped; the plurality of fuel tanks comprising a second communication interface and a fuel level sensor operable to measure the level of fuel within the tanks; wherein the plurality of servers are operable to receive communications from the plurality of fuel pumps and the plurality of fuel tanks and further operable to analyze the amount.

Another embodiment comprises a method of monitoring fuel at gas stations comprising: receiving, at a server, data from a gas pump regarding fuel sales or amount of fuel pumped; receiving, at as server, data from a gas tank connected to the gas pump regarding fuel level; analyzing, at a server, the gas pump and gas tank data to determine if there is theft or faulty machinery connected to the gas pump or gas tank.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
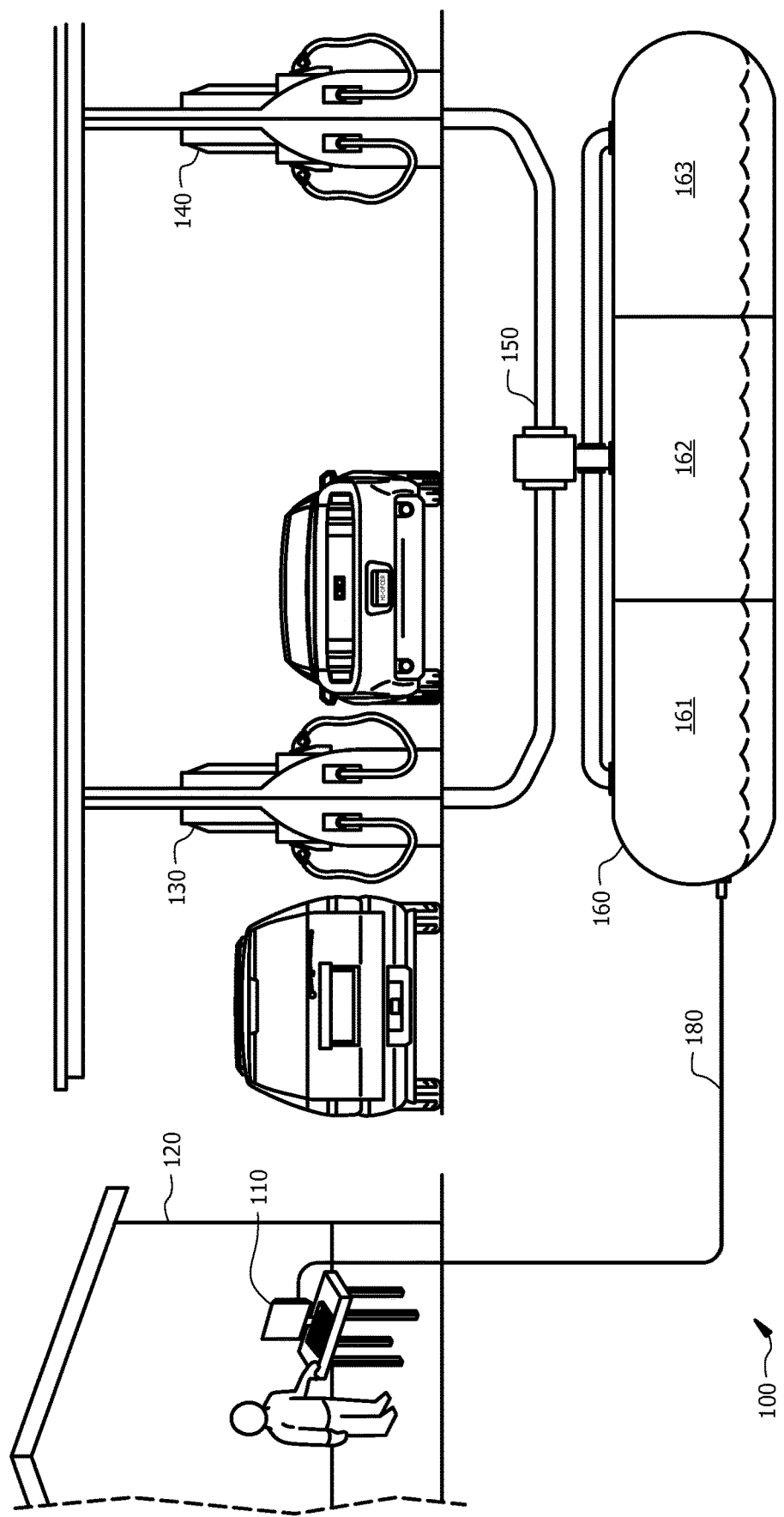
FIG. 1 is a diagram of a prior art embodiment of a gas station.

Referring now to FIG. 1, an embodiment of a typical gas station 100 is shown. Pumps 130 and 140 allow users to pump gas and customers pay either at the pumps or at kiosk 120. Pumps 130, 140 connect to a tank 160 via piping 150. Tank 160 may have a plurality of partitions (or physically separate tanks) 161, 162, 163. Kiosk 120 has a meter 110 with a connection 180 to sensors on tanks 160, 161, 162, 163 to measure the fluid level inside. Meter 110 can measure the overall tank level of 160 (or the partitions). Pumps 130 can measure how much fuel is being pumped from pump 130 and how much fuel is being paid for at pump 130. And pump 140 can measure how much fuel is being pumped from pump 140 and how much fuel is being paid for at pump 140. There are ways that thieves can manipulate pumps 130, 140, possibly with magnets, so that pumps 130, 140 will pump fuel without a purchase being made. An employee monitoring the meter 110 in the kiosk may not realize what's happening because meter 110 tracks the entire tank 160, not the individual pumps. The gas being stolen may not appear large compared to the size of tank 160.

Figure 2:
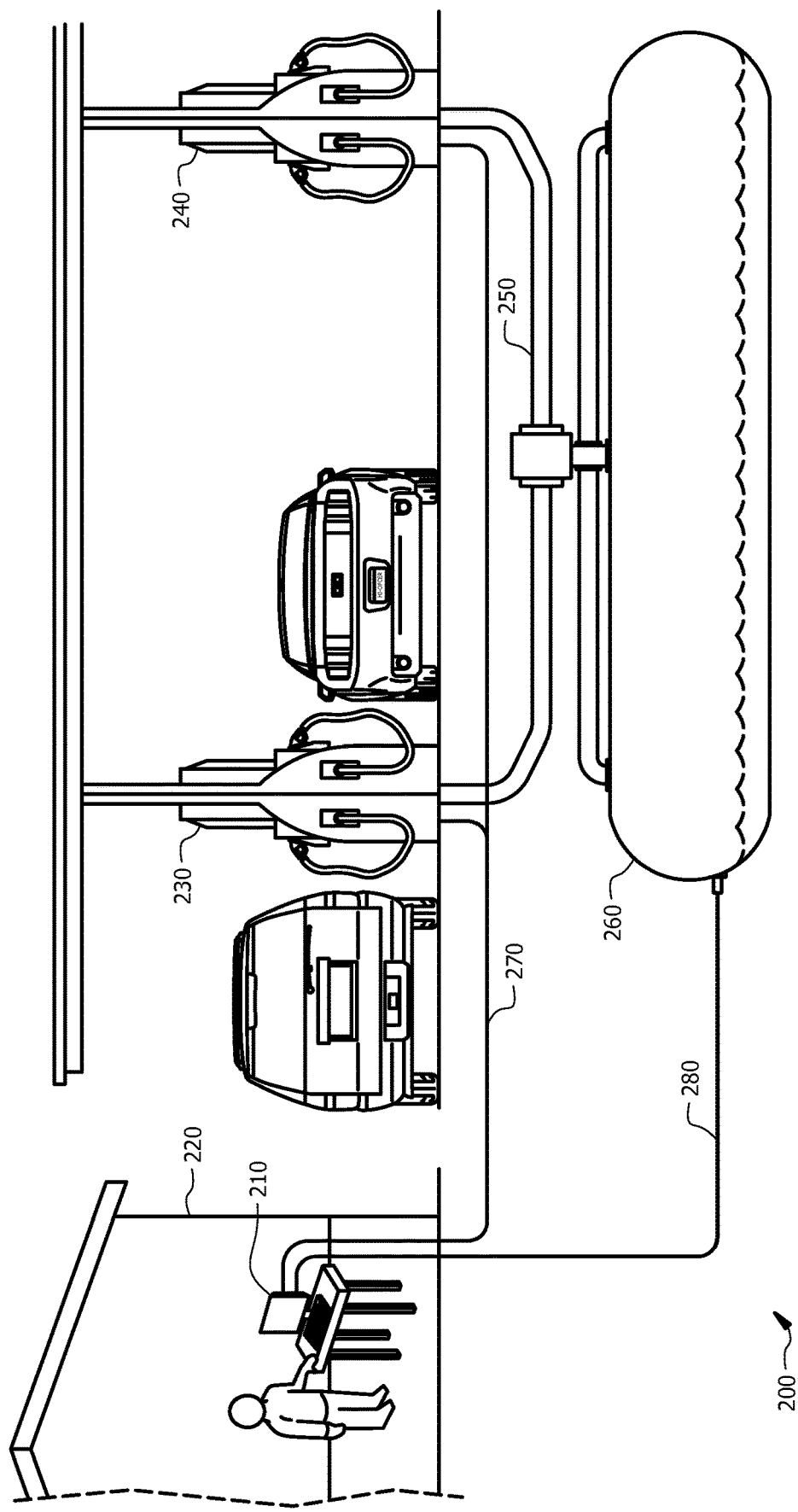
FIG. 2 is a diagram of an embodiment of the present teachings.

FIG. 2 shows an embodiment of a gas station 200 utilizing the teachings of the present disclosure. Pumps 230, 240 connect by piping 250 to a tank(s) 260. Pumps 230, 240 can measure the amount of fuel each is pumping and also low much money is being collected. Pumps 230, 240 have a connection 270 to kiosk 220 and meter 210. Pumps 230, 240 continually update meter 210 with how much fuel is being pumped and how much money/charges are being collected. Meter 210 also has a connection 280 to tank(s) 260 that measures (via any appropriate fluid level sensor) how much fuel is currently in tank(s) 260. Meter 210 can detect fraud several different ways. One way is to compare the pumped fuel in pumps 230 or 240 to the amounts charged b pumps 230 or 240. If there are not enough charges for the amount of fuel pumped then there might be a fraud taking place, or faulty machinery such as a leak. Either way, the gas station owner wants to detect the problem and fix it as soon as possible. Meter 210 can also compare the data from pumps 230, 240 to the overall tank level in tank 260.

Figure 3:
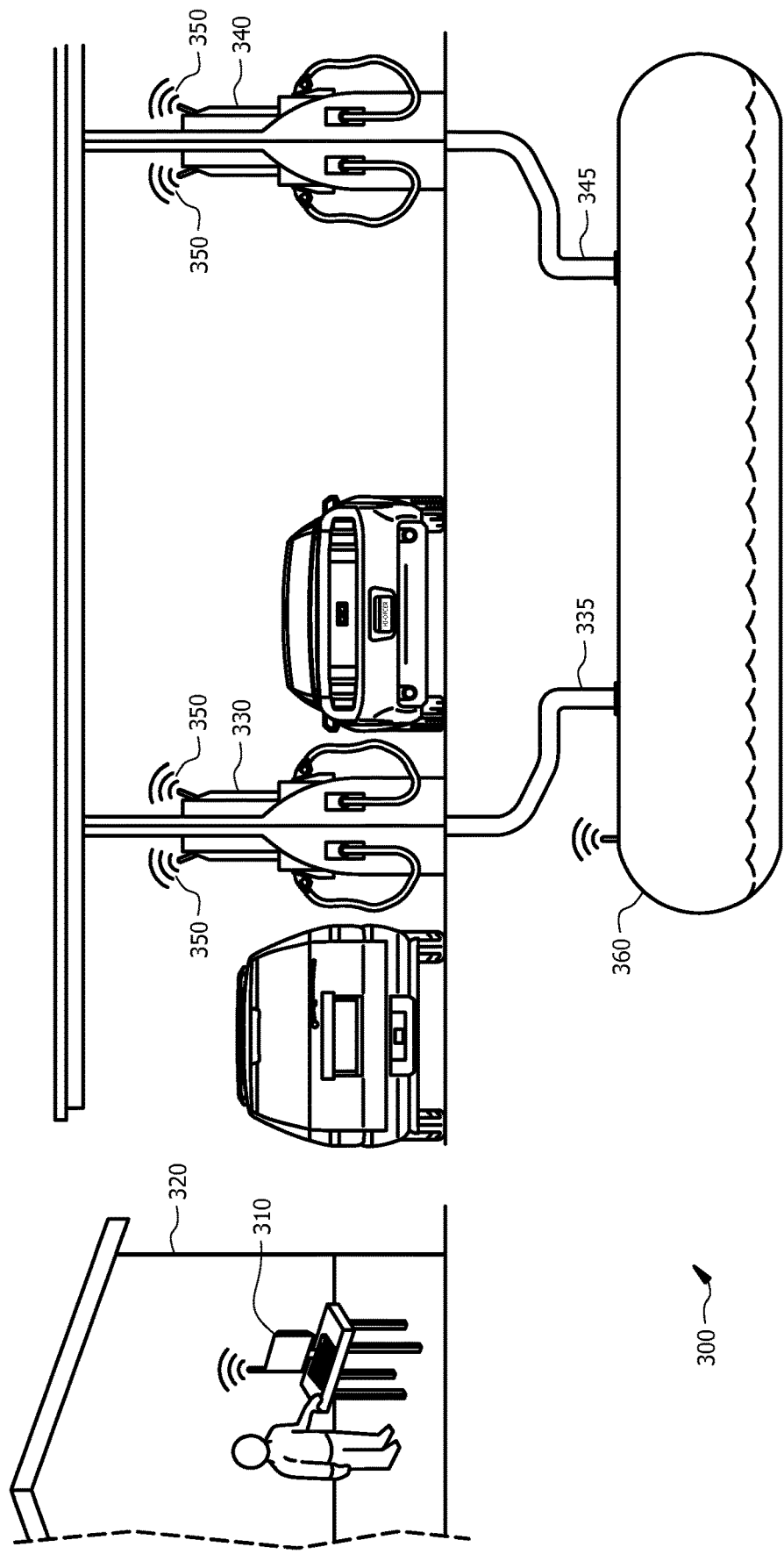
FIG. 3 is a diagram of an embodiment of the present teachings.

FIG. 3 show an embodiment of the present teachings comprising wireless technology. System 300 features a kiosk 320 and gas pumps 330, 340. Pumps 330, 340 connect to tank 360 via lines 335, 345. Pump transmitters 350 are disposed on pumps 330, 340 and communicate wirelessly with meter 310 in kiosk 320. A single pump could comprise single or multiple pump transmitters 350. Pump transmitters 350 can communicate with meter 310 via any appropriate wireless protocol such as Wi-Fi, Bluetooth, cellular or another. Pump transmitters 350 can be coupled to the payment processing system of the pump and/or a liquid sensor that determines the flow rate within the pump. The pump transmitter 350 can therefore communicate the amount of sold gas (or the amount of pumped gas) to meter 310. Meter 310 is also in communication with tank transmitter 360. Tank transmitter 360 can be coupled to a tank level sensor of any appropriate kind, and can report on the tank level to meter 310. Tank transmitter 360 (or its antenna) may need to be disposed closer to, or at, the surface in order to communicate properly with meter 310. As meter 310 receives measurements from pump transmitters 350 and tank transmitters 360 a comparison can be made to ensure that the pump data and the tank data match.

Figure 4:
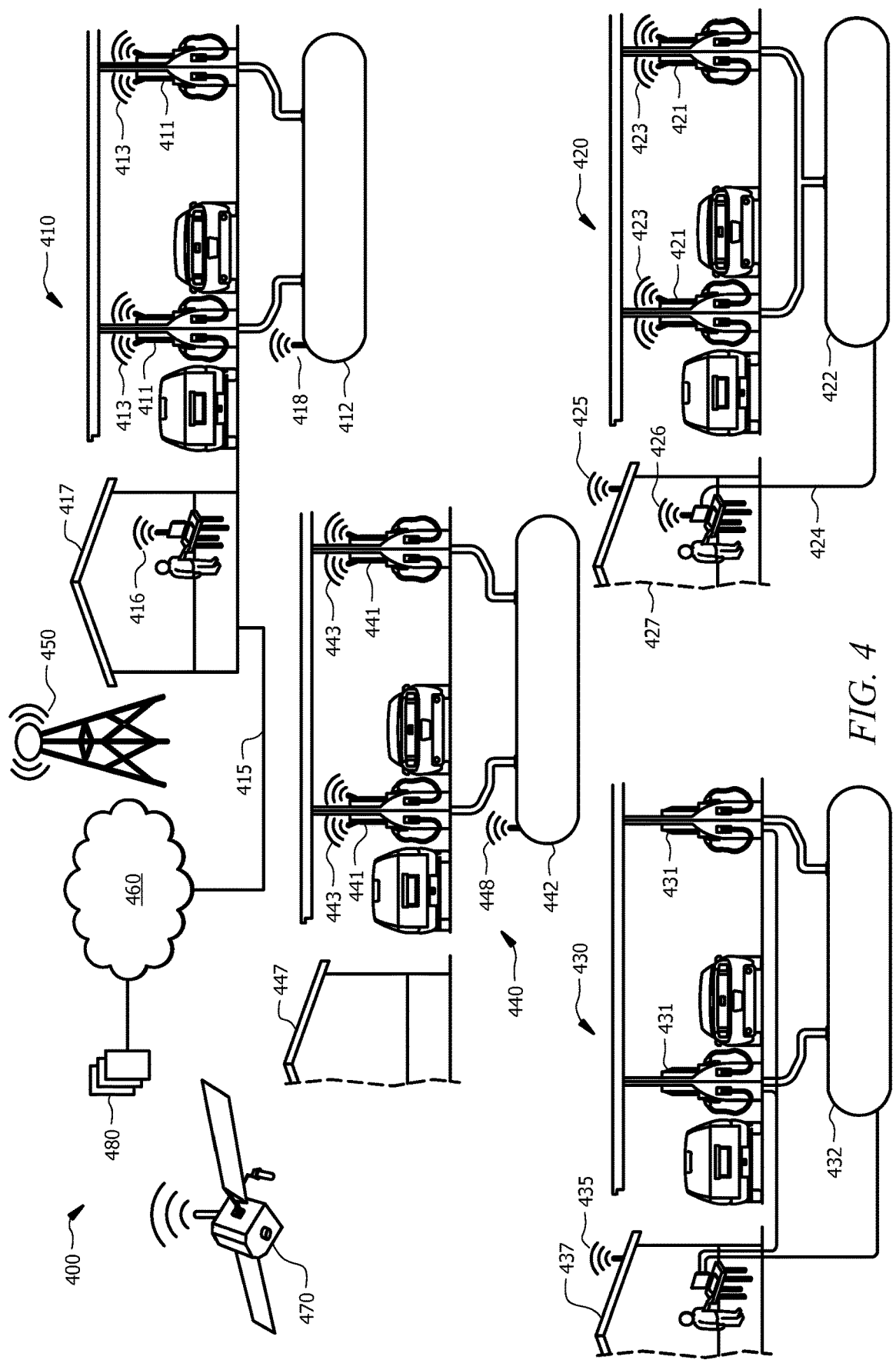
FIG. 4 is a diagram of an embodiment of the present teachings.

An owner/manager of multiple gas stations may want to use the present teachings to monitor fuel levels across a plurality of gas stations. FIG. 4 shows an embodiment of as system 400 comprising some of the current teachings. System 400 comprises as plurality of gas stations 410, 420, 430, 440. Each gas station 410, 420, 430, 440, comprises pumps 411, 421, 431, 441 respectively, kiosks 417, 427, 437, 447 respectively, and tanks 412, 422, 432, 442 respectively. Gas stations 410, 420, 430, 440 each comprise a system by which data from the pumps and the tanks are reported to servers 480 which can be located on the premises of an owner or management company or another remote location. Servers 480 can compare data from a plurality of gas stations and analyze patterns that emerge. Leaks can be detected, thefts can be detected, a pattern of multiple thefts can be detected, sales data can be tracked, and more. Gas stations 420 and 430 comprise radio interfaces 425, 435 that communicate with servers 480 by means of cellular network 450, satellite 480, and/or network 460. Gas station 410 communicates with servers 480 by means of a hardline connection 415 and network 460. Gas station 440 communicates with servers 480 via radio interfaces directly on the pump transmitters 443 and tank transmitter 448. As can be seen, the data from each gas station or pump can be collected in a number of different ways. Servers 480 can analyze the data received from the various gas stations 410, 420, 430, 440 and determine if there is theft or faulty machinery at each location. When this happens, servers 480 can communicate warnings to the gas station in question. The various telecommunications equipment can therefore be capable of two-way communication, when desired.

Figure 5:
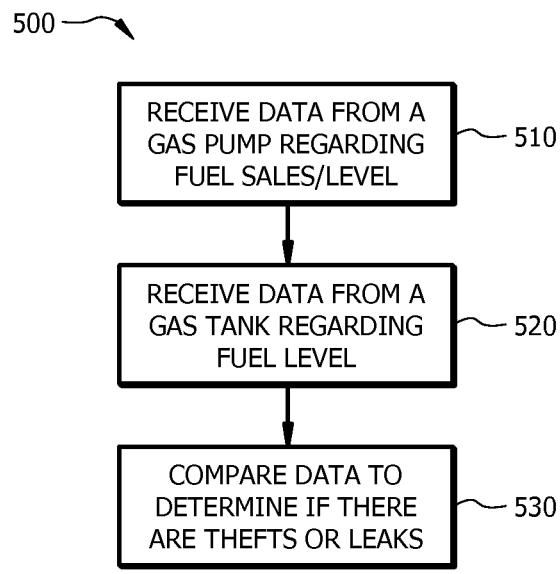
FIG. 5 is a flow-chart diagram of a process embodiment of the present teachings.

FIG. 5 shows an embodiment of a method practicing the teachings described herein. Data is received from a gas pump regarding fuel sales or fuel pumped 510. Data is also received from a gas tank regarding fuel level within the tank 520. The pump data and the tank data is then compared to determine if theft or leakage is occurring 530.

Figure 6:
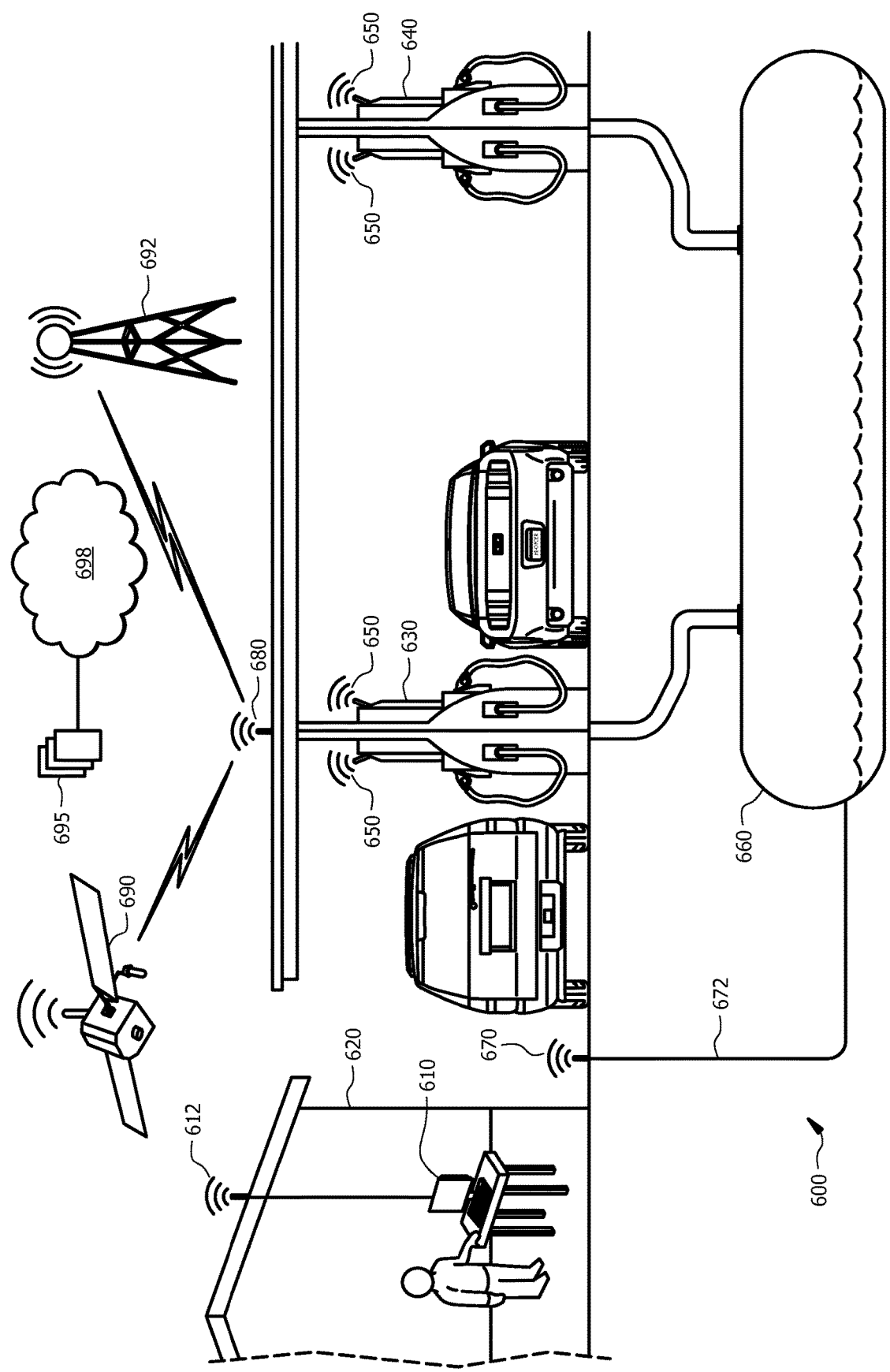
FIG. 6 is a diagram of an embodiment of the present teachings.

FIG. 6 shows an embodiment of the present teachings comprising a communications hub located at a gas station. As shown in system 600, hub 680 can act as a router/gateway between pump transmitters 650 and either kiosk meter 610 with interface 612, or directly with a wireless network such as cellular network 692 or satellite network 690. Pump transmitters 650 may have small ranges and be unable to communicate with meter 610 directly. The hub 680 can receive communications from the pump transmitters and forward the communications to meter 610 with interface 612 or to another network, bypassing the kiosk entirely.

As shown in FIG. 6, tank transmitter 670 is located near the ground surface and connects to a tank level sensor 672 that measures the level of fuel within tank 660. In some embodiments tank transmitter 670 will not be able to communicate effectively with meter 610, hub 680, or networks 690, 692 unless it is disposed at or near the ground level.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for monitoring fuel pumps and fuel tanks, and for detecting theft occurring at the fuel pumps comprising:
 a plurality of fuel pumps, the plurality of fuel pumps comprising:
  a payment processing system processing payment received from each fuel pump,
  a fuel sensor that is operable to measure an amount of fuel pumped from each fuel pump, and
  a first communication interface operable to communicate payments received and the amount of fuel pumped;
 a plurality of fuel tanks operable to supply fuel to the plurality of fuel pumps, the plurality of fuel tanks comprising:
  a fuel level sensor operable to detect a level of fuel within the fuel tanks, and
  a second communication interface operable to communicate the level of fuel; and
 a meter, the meter comprising a third communication interface operable to receive payments received and the amount of fuel pumped from the first communication interface, and to receive the level of fuel from the second communication interface, the meter operable to determine instances of a theft occurring at the plurality of fuel pumps by analyzing payments received at each of the plurality of fuel pumps, fuel data from each of the plurality of fuel pumps and fuel level data from the plurality of fuel tanks, the fuel data comprising the amount of fuel pumped and the fuel level data comprising the level of fuel within the fuel tanks, the meter comparing an amount of fuel pumped at a fuel pump with a payment received at the fuel pump, whereby the user can detect and fix theft occurring as soon as possible.

2. The system of claim 1 wherein the first, second, and third communication interfaces comprise hardline connections.

3. The system of claim 1 wherein the first, second and third communication interfaces comprise Wi-Fi interfaces.

4. The system of claim 1 wherein the first, second and third communication interfaces comprise Bluetooth interfaces.

5. The system of claim 1 wherein the plurality of fuel tanks comprises one fuel tank.

6. The system of claim 1 wherein the system is located at a gas station.

7. The system of claim 1 wherein the system communicates a warning to a user when theft is occurring.

8. The system of claim 1 wherein the meter is operable to communicate with a plurality of remote servers.

9. A system for monitoring fuel at a plurality of gas stations and for detecting theft occurring at fuel pumps thereat, comprising:
   a plurality of servers;
   a plurality of gas stations, each gas station comprising a plurality of fuel pumps, a plurality of fuel tanks, and a meter;
      the plurality of fuel pumps comprising a first communication interface, a fuel sensor operable to measure an amount of fuel pumped from each fuel pump, and a payment processing system processing payment received from each fuel pump;
      the plurality of fuel tanks, comprising a second communication interface and a fuel level sensor operable to measure a level of fuel within the fuel tanks
      the meter comprising a third communication interface operable to receive payments received and the amount of fuel pumped from the first communication interface, and to receive the level of fuel from the second communication interface, the meter operable to determine instances of theft at the plurality of fuel pumps by analyzing payments received at the plurality of fuel pumps, fuel data from the plurality of fuel pumps and fuel level data from the plurality of fuel tanks, the fuel data comprising the amount of fuel pumped and the fuel level data comprising the level of fuel within the fuel tanks; and
   wherein the plurality of servers are operable to receive communications from the plurality of fuel pumps and the plurality of fuel tanks and further operable to determine instances of theft occurring at a specific gas station of the plurality of gas stations by analyzing data including payments received by each of the plurality of fuel pumps, the amount of fuel pumped at each of the plurality of fuel pumps, and the level of fuel at the plurality of fuel tanks, by comparing an amount of fuel pumped at a fuel pump with a payment received at the fuel pump, whereby the user can detect and fix theft occurring as soon as possible.

10. The system of claim 9 wherein the first and second communication interfaces comprise hardline connections.

11. The system of claim 9 wherein the first sand second communication interfaces comprise Wi-Fi interfaces.

12. The system of claim 9 wherein the first and second communication interfaces comprise Bluetooth interfaces.

13. The system of claim 9 further comprising a plurality of communication hubs, the plurality of communication hubs located at the plurality of gas stations and operable to receive communications from at least one fuel pump and at least one fuel tank and forward the data to the plurality of servers.

14. The system of claim 9 wherein the first communication interface comprises a wireless interface and the second communication interface comprises a hardline connection.

15. The system of claim 9 wherein the first communication interface comprises a cellular interface.

16. The system of claim 9 wherein the plurality of fuel pumps further comprise a GPS interface.

17. A method of monitoring fuel at gas stations and for detecting theft occurring at each fuel pump thereof comprising:
   receiving, at a server, data from a gas pump regarding payment for fuel sales and amount of fuel pumped;
   receiving, at the server, data from a gas tank connected to the gas pump regarding fuel level;
   determining, at the server, instances of theft occurring at each fuel pump at a specific gas station by analyzing the data from the gas pump regarding payment for fuel sales and the amount of fuel pumped, and the data from the gas tank regarding the fuel level, by comparing an amount of fuel pumped at a fuel pump with a payment received at the fuel pump; and
   whereby the user can detect and fix theft occurring as soon as possible.

18. The method of claim 17 further comprising receiving, at the server, a GPS location of the gas pump or the gas tank.

19. The method of claim 17 further comprising sending, by the server, a warning to the specific gas station upon determination of theft at a gas pump thereof.

\* \* \* \* \*